(12) United States Patent
Vitali et al.

(10) Patent No.: US 8,391,358 B2
(45) Date of Patent: Mar. 5, 2013

(54) METHODS AND SYSTEM FOR ENCODING/DECODING SIGNALS INCLUDING SCRAMBLING SPECTRAL REPRESENTATION AND DOWNSAMPLING

(75) Inventors: Andrea Lorenzo Vitali, Bergamo (IT); Fabrizio Simone Rovati, Cinisello Balsamo (IT); Luigi Della Torre, Lissone (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 133 days.

(21) Appl. No.: 12/953,750

(22) Filed: Nov. 24, 2010

(65) Prior Publication Data

US 2011/0069753 A1    Mar. 24, 2011

Related U.S. Application Data

(62) Division of application No. 11/083,886, filed on Mar. 18, 2005, now Pat. No. 7,929,601.

(30) Foreign Application Priority Data

Mar. 18, 2004  (EP) .................................... 04006489

(51) Int. Cl.
*H04N 7/12* (2006.01)
(52) U.S. Cl. ............................................... 375/240.03
(58) Field of Classification Search .............. 375/240.03
See application file for complete search history.

(56) References Cited

U.S. PATENT DOCUMENTS

| 6,243,430 B1 * | 6/2001 | Mathe ........................... 375/346 |
| 7,308,099 B1 * | 12/2007 | Allamanche et al. ......... 380/210 |
| 2002/0116715 A1 | 8/2002 | Apostolopoulos .............. 725/85 |
| 2003/0076907 A1 | 4/2003 | Harris ........................... 375/350 |

FOREIGN PATENT DOCUMENTS

| EP | 1160770 | 12/2001 |
| EP | 1396841 | 3/2004 |
| WO | 0051279 | 8/2000 |

OTHER PUBLICATIONS

Goyal "Multiple Description Coding: Compression Meets the Network" IEEE Signal Proc. Mag. Sep. 2001 pp. 74-93.

(Continued)

*Primary Examiner* — Richard Torrente
(74) *Attorney, Agent, or Firm* — Allen, Dyer, Doppelt, Milbrath & Gilchrist, P.A.

(57) ABSTRACT

A method for encoding and decoding media signals, includes the operations of generating at a transmitting side multiple descriptions associated to data of the media signals through a downsampling operation performed on the data, and decoding at a receiving side the multiple descriptions for reconstructing the data by merging the multiple descriptions. The operation of generating multiple descriptions further includes the operations of obtaining a spectral representation of the data, including bands associated to different ranges, the bands being obtained by a suitable quantization operation and including at least one highly quantized band, that is subjected to a higher degree of quantization. A scrambling operation is performed on the spectral representation by moving the at least one highly quantized band to a different range, the scrambling operation being performed prior the downsampling operation. In decoding, a descrambling operation is performed before the merging operation on the multiple descriptions.

23 Claims, 5 Drawing Sheets

OTHER PUBLICATIONS

Cosman et al., "Vector Quantization of Image Subbands: a Survey", Sep. 1995; Robert Swann, "MPEG-2 Video Coding over Noisy Channels", Signal Processing and Communication Lab, University of Cambridge, Mar. 1998.

Swann, "MPEG-2 Video Coding over Noisy Channels", Signal Processing and Communication Lab, University of Cambridge, Mar. 1998.

Gray "Quantization", IEEE Transactions on Information Theory, vol. 44, o. 6, Oct. 1998.

Goyal, "Beyond Traditional Transform Coding", University of California, Berkeley, Fall 1998.

Kovačević et al., "Multiple Descriptions—Source-Channel Coding Methods for Communications", Bell Labs, Innovation for Lucent Technologies, 1998.

Goyal et al., "Multiple Description Transform Coding of Images", Proceedings of IEEE Conf. on Image Proc., Chicago, Oct. 1998.

Servetto, "Compression and Reliable Transmission of Digital Image and Video Signals", University of Illinois at Urbana-Champaign, 1999.

Apostolopoulos et al., "Unbalanced Multiple Description Video Communication using Path Diversity", IEEE International Conference on Image Processing (ICIP), Thessaloniki, Greece, Oct. 2001.

Apostolopoulos et al., "Modeling Path Diversity for Multiple Description Video Communication", ICASSP, May 2002.

Apostolopoulos et al., "On Multiple Description Streaming with Content Delivery Networks", HP Labs, Palo Alto, Feb. 2002.

Apostolopoulos et al., "Video Streaming: Concepts, Algorithms and Systems", HP Labs, Palo Alto, Sep. 2002.

Chen et al., "Recent Developments in Multidimensional Multirate Systems", 8378 IEEE Transactions on Circuits and Systems for Video Technology, Apr. 3, 1993, No. 2, New York, US, XP 000367177, pp. 116-137.

Fumagalli et al., "Video Transmission Over IP By Using polyphase Downsampling Multiple Description Coding", IEEE Iternational Conference on Multimedia and Expo © 2001 IEEE 0-7695-1198-8, pp. 161-163.

Khansari et al., "Subband Decomposition of Signals with Generalized Sampling", 8084 IEEE Transations on Signal Processing 41 Dec. 1993, No. 12, New York, US, pp. 3365-3375, XP 000426653.

Lee et al., "AN Integrated Application of Multiple Description Transform Coding and Error Concealment for Error-Resilient Video Streaming", © 2003 Published by Elsevier, pp. 957-970.

Wah et al.; "A Survey of Error-Concealment Schemes for Real-Time Audio and Video Transmissions over the Internet", Multimedia Software Engineering, Dec. 11, 2000, pp. 17-24, XP010528702, ISBN: 0-7695-0933-9.

* cited by examiner

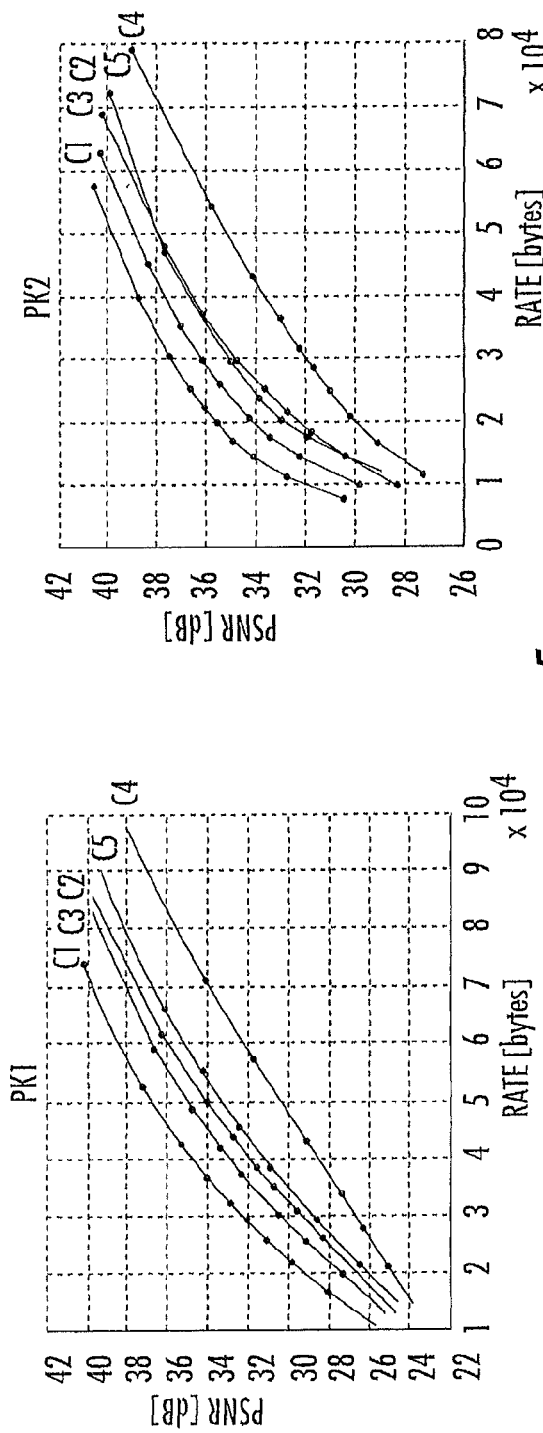
FIG. 5
FIG. 6
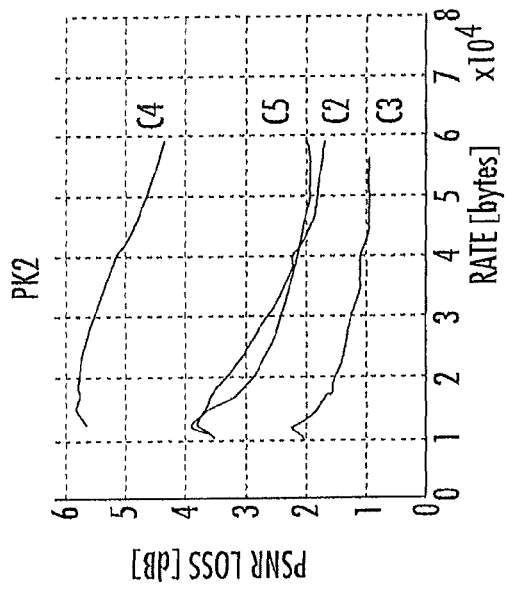
FIG. 7
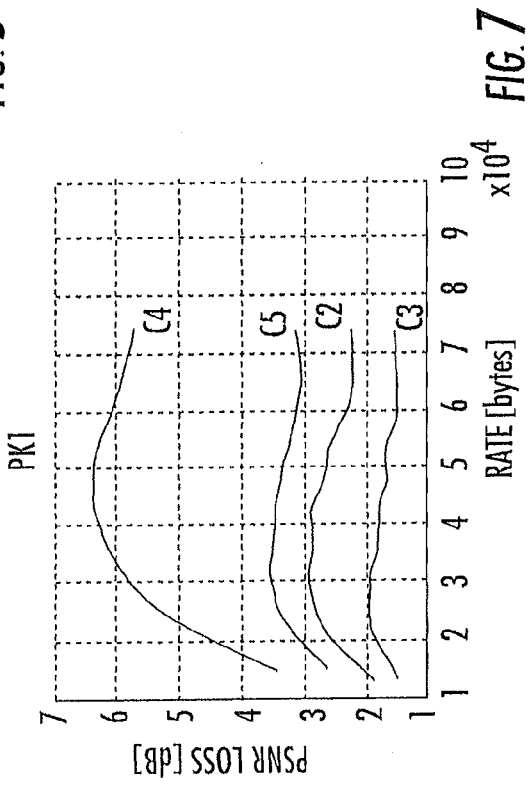
FIG. 8

METHODS AND SYSTEM FOR ENCODING/DECODING SIGNALS INCLUDING SCRAMBLING SPECTRAL REPRESENTATION AND DOWNSAMPLING

RELATED APPLICATION

This application is a divisional of Ser. No. 11/083,886 filed Mar. 18, 2005 now U.S. Pat. No. 7,929,601, the entire disclosure of which is hereby incorporated herein by reference.

FIELD OF THE INVENTION

The present invention relates to encoding/decoding techniques, for example for media signals, and more particularly to coding video signals by Multiple Description Coding (MDC) using polyphase downsampling (PDMD).

BACKGROUND OF THE INVENTION

The goal of Multiple Description Coding (as described e.g. in V. K. Goyal "Multiple Description Coding: Compression Meets the Network" IEEE Signal Proc. Mag. September 2001 pp. 74-93, is to create several independent bitstreams using an existing video codec (i.e. coder-decoder). Bitstreams can be decoded independently or jointly. The larger the number of the bitstreams decoded, the larger the quality of the output video signal.

Multiple Description Coding (MDC) requires a pre-processing stage upstream of the encoder, to split the video sequence and control redundancy among subsequences. It also requires a post-processing stage downstream of the decoder, to merge the received and successfully decoded substreams. Multiple Description Coding greatly improves error resiliency, because each bitstream can be decoded independently. Also, variable bandwidth/throughput requirements can be managed by transmitting a suitable number of descriptions. However, coding efficiency is somewhat reduced depending on the amount of redundancy left among subsequences.

Multiple Description Coding is essentially analogous to Scalable Coding (also known as Layered Coding). The difference lies in the dependency among bitstreams. The simplest case is when two bitstreams are created. In the case of scalable coding they are referred to as "base layer" and "enhancement layer", respectively. The latter layer depends on the former layer and cannot be decoded independently therefrom. On the other hand, in the case of Multiple Description Coding, each description can be individually decoded to get a base quality video. As for Scalable Coding, there can be spatial, temporal or SNR (Signal-to-Noise Ratio) Multiple Descriptions (MD).

Replicated headers/syntax and replicated motion vectors among bitstreams greatly impede coding efficiency in SNR MD. Replicated headers/syntax also hinder temporal MD, and motion compensation is less effective because of the increased temporal distance between frames. Spatial MD is hindered by headers/syntax as well. However, contrary to temporal MD, motion compensation is not affected, particularly when 8×8 blocks are split into smaller blocks, as in the latest H.264 codec. Because of this, spatial MD Coding is usually regarded as the best choice for video coding.

The underlying video codec can be either one of the traditional approaches based on DCT (Discrete Cosine Transform) transform and motion compensation (e.g. MPEG-x, H.26x), or one of the more recent codec based on the wavelet 3D transform (e.g. SPHIT). Several schemes exists: overlapping quantization (MDSQ or MDVQ), correlated predictors, overlapped orthogonal transforms, correlating linear transforms (MDTC, e.g. PCT or pairwise correlating transform for 2 MD), correlating filter banks, interleaved spatial-temporal sampling (e.g. video redundancy coding in H.263/H.263+), spatial-temporal polyphase downsampling (PDMD, see below), domain based partitioning (in the signal domain or in a transform domain), FEC based MDC (e.g. using Reed-Solomon codes).

A simple scheme for SNR MD is coding of independent video fluxes created by means of MD quantizers, either scalar or vector (MDSQ, MDVQ). The structure of the MD quantizer controls redundancy. A simple scheme for Spatial/Temporal MD is coding of independent video fluxes created by means of Spatial or Temporal Polyphase Downsampling (PDMD). A programmable Spatial or Temporal low-pass filter controls redundancy.

As an example, Temporal MD can be achieved by separating odd and even frames, creating two subsequences. Alternatively odd and even fields can be separated. Spatial MD is achieved by separating pixels of 2×1 blocks, so that two subsequences are created. Alternatively four subsequences can be created by separating pixels in 2×2 block. The two techniques can be combined. Each subsequence is then fed into a standard video encoder.

Polyphase downsampling (PDMD) for instance is based on a downsampling of pixels of a picture of the video signal. The number of pixels in a row is proportional to a horizontal sampling frequency Fsh, while the number of pixels in a column is proportional to a vertical sampling frequency Fsv. With reference to FIG. 1, where a diagram of the power spectrum, i.e. power P as a function of frequency is shown, given a certain sampling frequency Fs, a spectrum S of the data will extend from the 0 frequency up to the Nyquist frequency, that is Fs/2. It must be understood that the spectrum S of FIG. 1 is simplified, since for pictures the spectrum will be two dimensional and will extend from 0 up to Fsh/2 and from 0 up to Fsv/2.

As can be seen from FIG. 1 (*a*), the spectrum S is subdivided in a high frequency part HS, corresponding to a high frequency range HR, i.e. the Fs/4 ... Fs/2 range, and a low frequency part LS, corresponding to a low frequency range LR, i.e. the Fs/2 ... 0 range. A downsampling operation DS is performed on spectrum S. A downsampling operation in general is performed by discarding some of the samples. Performing a N:1 downsampling means that only one sample out of N samples survive such a downsampling operation. In the frequency domain, the downsampling operation corresponds to an operation of folding the spectrum around a certain frequency.

By way of example, when a 2:1 downsampling operation DS is performed, as represented in FIG. 1 (*b*), a folded spectrum $S_f$ is generated, where the sampling frequency Fs is reduced to its half, Fs/2. Therefore the Nyquist frequency is reduced from Fs/2 down to Fs/4. The high frequency part HS of the spectrum S that was in the high frequency range HR will be folded in the low frequency range LR, the 0 ... Fs/4 range. In particular, the frequencies located in proximity of the Nyquist frequency Fs/2 in the original spectrum S will be folded in proximity of the 0 frequency in the folded spectrum $S_f$. It must be noted that in FIG. 1 (*b*), as in FIG. 1 (*c*), that will be described in the following, two folded spectrum $S_f$ are shown, since the 2:1 downsampling operation DS originates two descriptions.

As another example, if a 3:1 downsampling is performed, the sampling frequency is reduced from Fs down to Fs/3. The Nyquist frequency will be reduced to Fs/6. Frequencies that were above Fs/6 will be folded in the following way: frequencies at Fs/2=3*Fs/6 will be folded at Fs/6, frequencies at 2*Fs/6 will be folded at 0 frequency. In general, thus, when N:1 downsampling is performed, the sampling frequency is reduced to Fs/N, the Nyquist frequency is reduced to Fs/2/N. The frequencies of the spectrum above Fs/2/N will be folded in the allowed range. Frequencies at n*Fs/2/N, where n is an odd integer index will thus be placed at Fs/2/N, frequencies at n*Fs/2/N, where n is an even integer index will be placed at 0.

From the above discussion turns out that, when the PDMD procedure is applied, the high frequencies of the spectrum of the picture are folded over the low frequencies. When standard video codecs are used to compress generated descriptions, such a compression operation CM originates a quantization error Qerr, as shown in FIG. 1c, that will affect the high portion HS of the folded spectrum $S_f$. In other words, the high portion HS of the spectrum S is highly quantized, to a higher degree with respect to the low portion LS, since the high portion HS is less important from a perceptive point of view. This means however that, when the folded spectrum $S_f$, as shown in FIG. 1 (d), will be unfolded in an unfolded spectrum Su, by a merging operation US on the decompressed descriptions at the receiver side, the quantization error Qerr will be located in the middle of the unfolded spectrum $S_u$, near the Fs/4 frequency, and the effects of such a quantization error Qerr will be therefore quite noticeable.

Further, it must be noted that each generated description, as a result of the downsampling operation, will have a folded spectrum with a relevant amount of energy in its high portion. This circumstance makes the task of standard video encoders more difficult, since high frequency coefficients will not be low after transform, probably the quantized coefficients will not be zero and, thus, the entropic coding of quantized coefficient will be inefficient. This means that the compression efficiency will be low, the quality for a given bitrate will be low.

The topics considered in the foregoing form the subject of extensive technical literature, as evidenced e.g. by: P. C. Cosman, R. M. Gray, M. Vetterli, "Vector. Quantization of Image Subbands: a Survey", September 1995; Robert Swann, "MPEG-2 Video Coding over Noisy Channels", Signal Processing and Communication Lab, University of Cambridge, March 1998; Robert M. Gray "Quantization", IEEE Transactions on Information Theory, vol. 44, n. 6, October 1998; Vivek K. Goyal, "Beyond Traditional Transform Coding", University of California, Berkeley, Fall 1998; Jelena Kovačević, Vivek K. Goyal, "Multiple Descriptions—Source-Channel Coding Methods for Communications", Bell Labs, Innovation for Lucent Technologies, 1998; Jelena Kovačević, Vivek K. Goyal, Ramon Arean, Martin Vetterli, "Multiple Description Transform Coding of Images", Proceedings of IEEE Conf. on Image Proc., Chicago, October 1998; Sergio Daniel Servetto, "Compression and Reliable Transmission of Digital Image and Video Signals", University of Illinois at Urbana-Champaign, 1999; Benjamin W. Wah, Xiao Su, Dong Lin, "A survey of error-concealment schemes for real-time audio and video transmission over internet", Proceedings of IEEE International Symposium on Multimedia Software Engineering, December 2000; John Apostolopoulos, Susie Wee, "Unbalanced Multiple Description Video Communication using Path Diversity", IEEE International Conference on Image Processing (ICIP), Thessaloniki, Greece, October 2001; John Apostolopoulos, Wai-Tian Tan, Suise Wee, Gregory W. Wornell, "Modeling Path Diversity for Multiple Description Video Communication", ICASSP, May 2002; John Apostolopoulos, Tina Wong, Wai-Tian Tan, Susie Wee, "On Multiple Description Streaming with Content Delivery Networks", HP Labs, Palo Alto, February 2002; and John Apostolopoulos, Wai-Tian Tan, Susie J. Wee, "Video Streaming: Concepts, Algorithms and Systems", HP Labs, Palo Alto, September 2002.

SUMMARY OF THE INVENTION

An object of the present invention is to provide an improved arrangement overcoming the drawbacks of the prior art arrangements discussed above, by providing a method for Multiple Description Coding that allows a high compression efficiency and high quality for a given bitrate when implemented in encoders and decoders.

According to the present invention, objects are achieved with the methods having the features set forth in the claims that follow. The invention also relates to a corresponding system as well as a computer program product loadable in the memory of at least one computer and including software code portions for performing the method of the invention.

A preferred embodiment of the invention is thus a method for encoding/decoding a video signal sequence that provides for scrambling the spectrum of the picture to be encoded using PDMD coding, to raise the efficiency of the compression for generated description, and also to enhance the visual appearance. A particularly preferred embodiment of the invention is directed to a scrambling procedure in the frequency domain, although a scrambling procedure in the pixel domain is also provided.

BRIEF DESCRIPTION OF THE DRAWINGS

The invention will now be described by way of example only, by referring to the drawing figures, wherein:

FIGS. 5, 6, 7, 8 are graphs representative of test simulations of a system within the framework of the arrangement described.

DETAILED DESCRIPTION OF THE PREFERRED EMBODIMENTS

Figure 2:
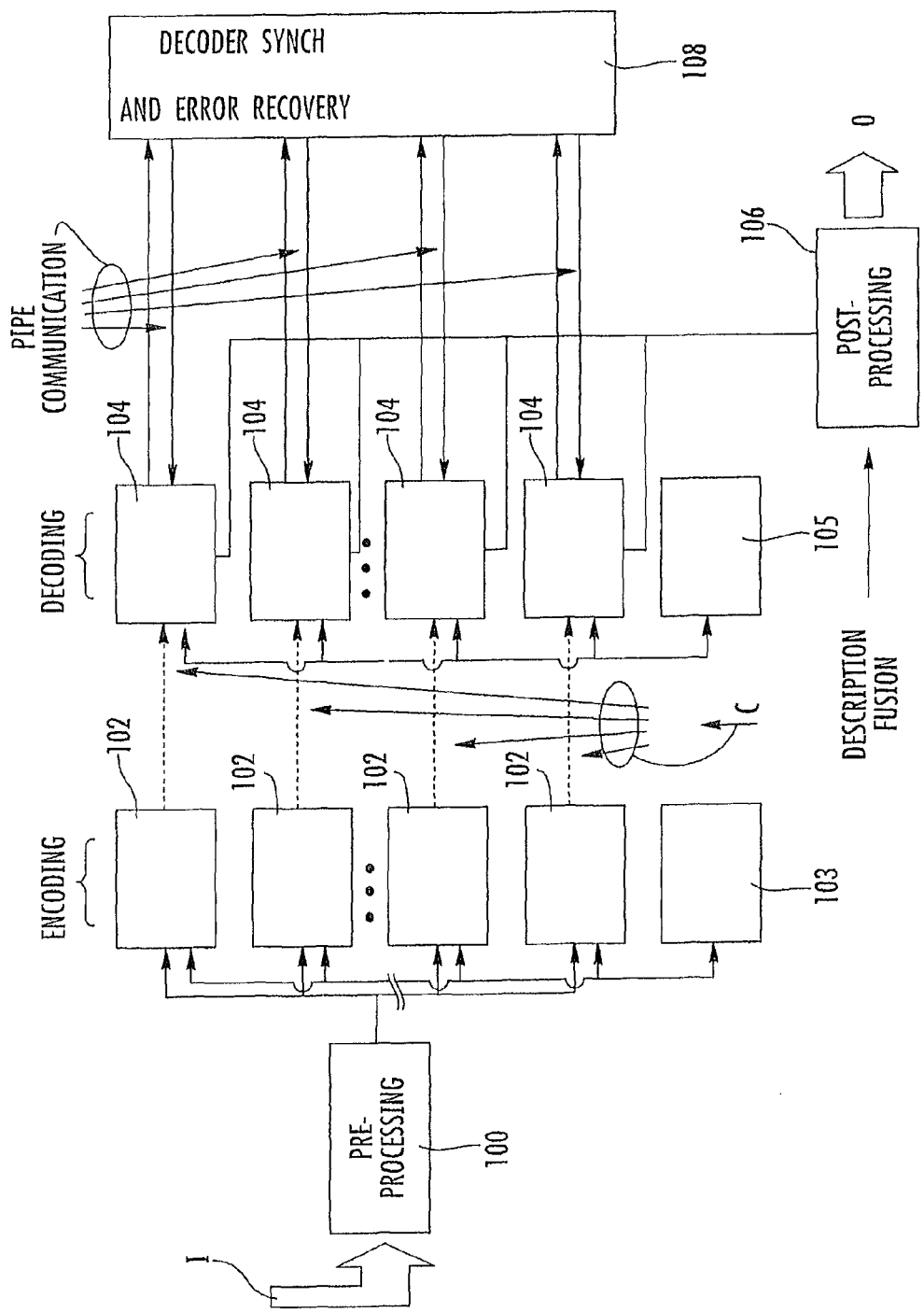
FIG. 2 is a schematic block diagram of an exemplary encoding-decoding system according to the present invention.

FIG. 2 shows a block diagram of an encoding/decoding system adapted to operate according to the invention. There, reference I indicates an input video sequence comprised of a digital video signal to be transmitted. The input signal I is fed to a pre-processing block 100 that creates a multiple descriptions by way of spatial sub-sampling. The subsequences from the pre-processing block 100 are fed to a set of N encoder blocks, each indicated by the reference 102.

In the embodiment shown, coding of independent video flows is created with spatial polyphase downsampling (PDMD). A programmable spatial or temporal low-pass filter controls redundancy. The encoder signals from the encoder blocks 102 are sent over a transmission channel C to the receiver side. On the receiver side a set of N H.264 decoder blocks are provided, each indicated 104. The output signals of the decoder blocks 104 are fed to a synchronization block 106 and the signals from this block are sent to the decoder blocks. The synchronization block 106 is also able to effect error recovery. The output signals from the decoder blocks 104 are also fed to a post-processing block 108 that merge the multiple descriptions. The output of the post-processing block 108 is the output sequence O.

According to the proposed method, to raise the efficiency of the compression for generated descriptions, and also to enhance the visual appearance, the spectrum of the picture to be encoded using PDMD undergoes a scrambling operation. The proposed PDMD procedure will now be described with reference to FIG. 3 and steps (a)-(f) therein.

Figure 3:
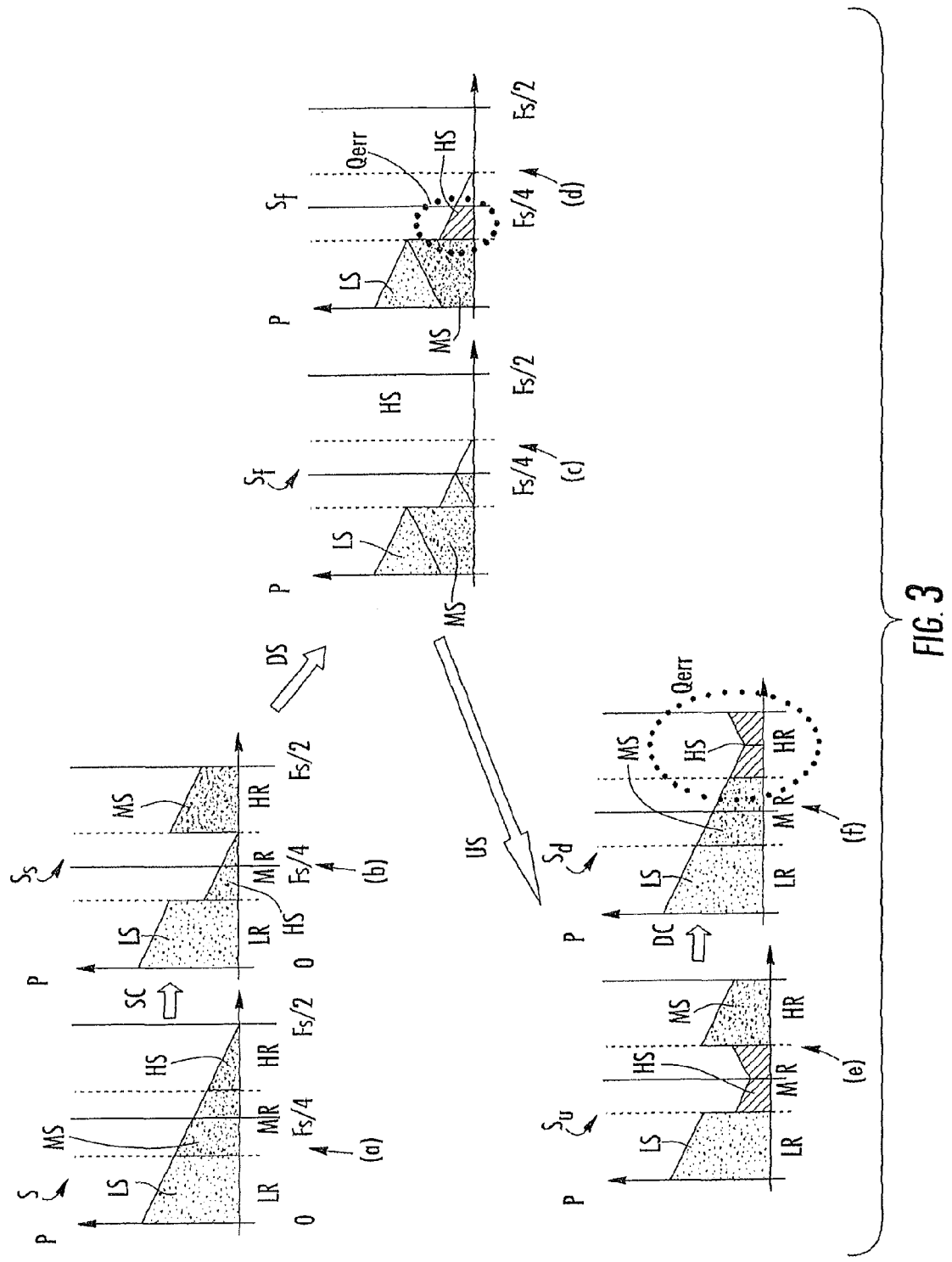
FIG. 3 is a schematic diagram illustrating an example of an encoding step within the framework of the arrangement described.

In FIG. 3 step (a) the spectrum S is shown, that is subdivided in a low frequency portion LS in a low frequency range LR, a middle frequency portion MS in a middle frequency range MR and a high frequency portion HS in a high frequency range HR. According to the proposed PDMD procedure, the spectrum S undergoes a scrambling operation, indicated with reference SC, so that the high frequency portion HS of the original spectrum S of the picture is displaced from the high frequency range HR to the middle frequency range MR, as shown in FIG. 3 step (b). The high frequency portion HS thus swaps with the middle frequency portion MS, originating a scrambled spectrum $S_s$, so that when a folded spectrum $S_f$ is generated through the downsampling operation DS, such a high frequency portion HS of the original spectrum S appears in the high frequency range HR of each folded spectrum $S_f$.

Figure 1:
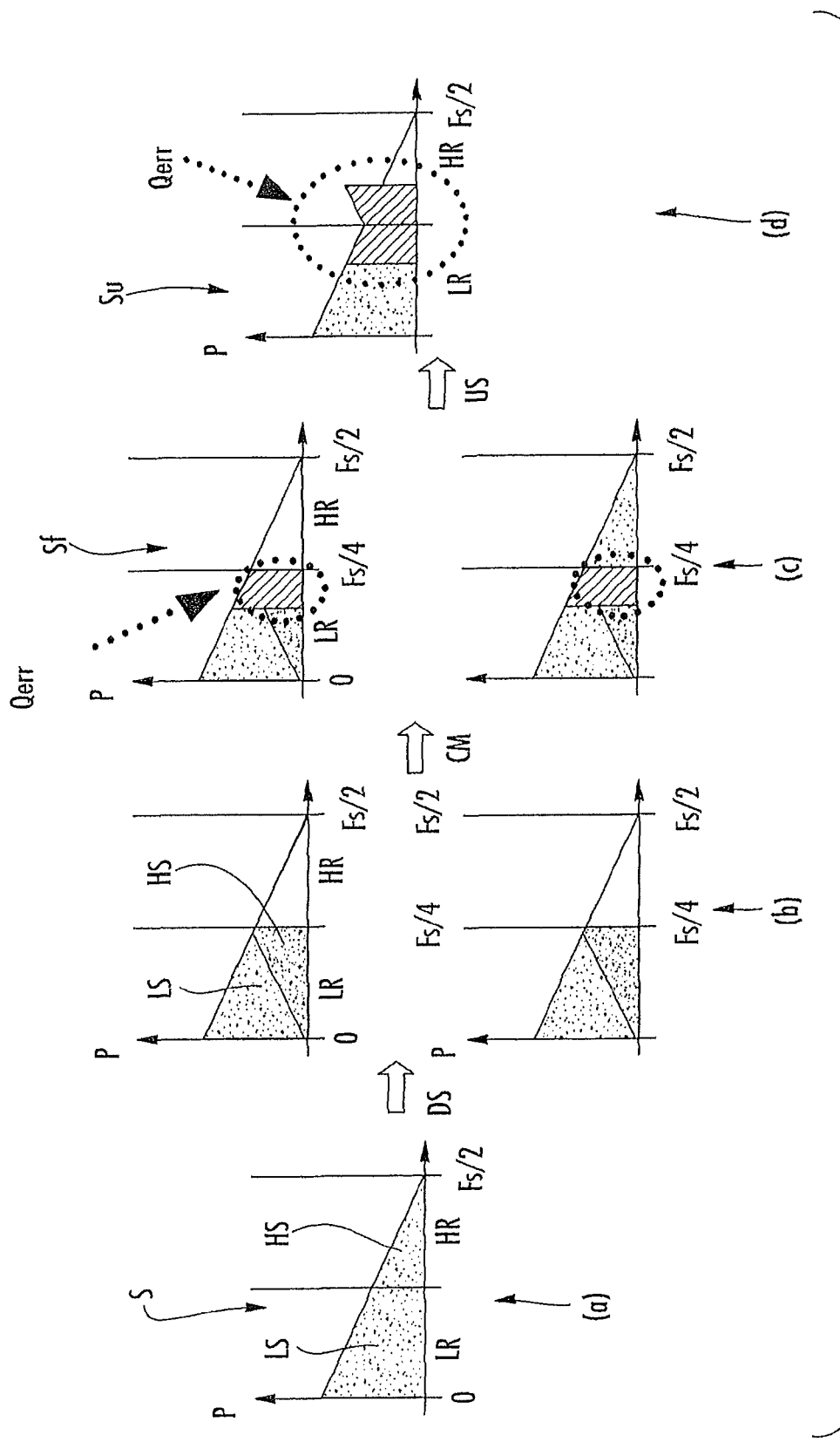
FIG. 1 is a schematic diagram illustrating encoding steps according to the prior art.

The example shown in FIG. 3 refers to the case when two descriptions are generated by PDMD coding, through 2:1 downsampling, like the case already described with reference to FIG. 1. In the same way, thus, each spectrum S will be folded along the frequency Fs/4. Therefore, the high frequency portion HS of the original spectrum S is moved at such a frequency Fs/4, in a range where is supposed to undergo a lower quantization by the coder. As a consequence, the middle portion MS of the original spectrum S will be moved under Fs/2 in the folded spectrum $S_f$. It can be seen from FIG. 3 step (c), that, after the folding due to the downsampling DS, the high portion HS of the original spectrum S is still located in the high frequency side of the folded spectrum $S_f$, whereas the frequency position of the low portion LS of the original spectrum S is not affected. This allows for preserving the visual meaning of the picture even after the scrambling operation SC has been performed on the spectrum S and makes the task of standard video encoders more easy, since high frequency coefficients will be low after transform, as can be seen in FIG. 3*d*, probably the quantized coefficients will be zero and the entropic coding of quantized coefficient will be quite efficient. Summarizing, the compression efficiency will be high, the quality for a given bitrate will also be high.

Also, it must be noted that when the folded spectrum $S_f$ will be unfolded by applying the merging operation on the decompressed descriptions, as shown in FIG. 3 step (e), an unfolded spectrum $S_u$ will be obtained, in which the quantization error Qerr will lay in the middle range MR of frequencies. Thus a descrambling operation DC is performed over the unfolded spectrum $S_u$, obtaining a descrambled spectrum $S_d$, that is shown in FIG. 3 step (f). As can be seen, the quantization error Qerr is now moved to the high range HR of frequencies of the descrambled spectrum $S_d$, where it is less noticeable.

Figure 4:
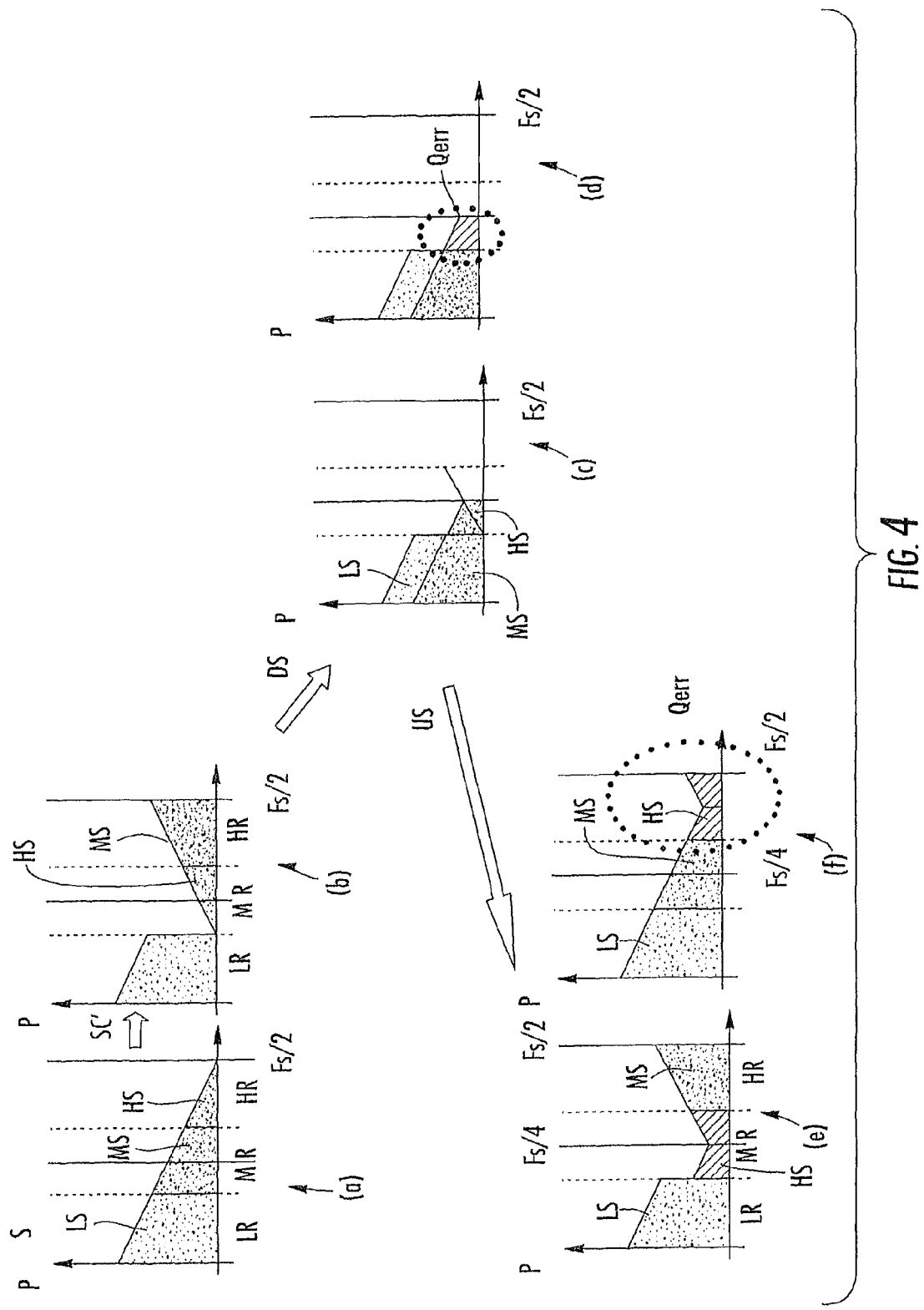
FIG. 4 is a schematic diagram illustrating an example of an encoding step within the framework of the arrangement described.

In FIG. 4 steps (a)-(f) the same procedure of FIG. 3 is shown, where the spectrum S undergoes a scrambling operation SC', that is based on a mirror reflection instead of a swap. The high frequency portion HS of the original spectrum S of the picture is displaced as shown in FIG. 4 step (b). The high frequency part HS and the middle frequency part MS, considered altogether, are mirror reflected. When a folded spectrum $S_f$ is generated through downsampling DS, such a high frequency portion HS of the original spectrum S appears in the high frequency range HR of each folded spectrum $S_f$ as well.

The easiest way to perform the scrambling operation SC on the spectrum S is to transform the corresponding picture into the frequency domain, through a suitable transform matrix having corresponding transform coefficients. Each coefficient will thus correspond to a frequency band. Moving coefficients, i.e. applying permutations to their matrix, is actually moving parts of the spectrum. Any transform operation from the pixel domain to the frequency domain may be used. Of course, the larger the transform size, the smaller will be the subbands that can be moved in the given spectrum.

It must be noted that the scrambling of the coefficients must match the downsampling factor so that high frequencies will be appear to be in the high portion of the folded spectrums. The scrambling procedure just described for the frequency domain can be performed also in the pixel domain. The scrambling procedure in the pixel domain involves isolating frequency bands by bandpass filtering, then such frequency bands can be remodulated to a given frequency by multiplication with a suitable co/sinusoid. Alternatively, frequency bands can be moved to the 0 frequency using a demodulator and a lowpass filter, then they can be moved to the desired frequency using a modulator and a lowpass filter.

The described method has been tested using a standard JPEG encoder for the compression of generated descriptions. Black-and-white images have been used to verifying the performance: a first picture PK1 used for testing has a rich spectrum with a lot of energy in the high portion of its spectrum, whereas a second picture PK1 has a relatively poor spectrum with a low amount of energy in the high portion of the spectrum. The classical PDMD coding has been used so that two descriptions are generated by downsampling of a 2×1 pixel window and four descriptions are generated by downsampling 2×2 pixel window.

In FIGS. 5 and 6 results for pictures PK1 and, PK2 respectively are shown in the form of Rate-Distortion diagrams, plotting the PSNR (Signal to Noise Ratio Power) in function of rate. The five curves, indicates respectively with C1, C2, C3, C4, C5, represents single description coding, PDMD with downsampling of 2×1 pixel window without scrambling, PDMD with downsampling of 2×1 pixel window with scrambling, PDMD with downsampling of 2×2 pixel window without scrambling, PDMD with downsampling of 2×2 pixel window with scrambling. In FIGS. 7 and 8 the PSNR loss as a function of rate of curves C2, C3, C4, C5 with respect to single description coding is shown, that allows for appreciating the reduced PSNR loss for curves C3 and C5.

The proposed method and apparatus show several advantages. The proposed method allows for raising the efficiency of the compression for generated description, and also to enhance the visual appearance. The proposed method provides that the high portion of the spectrum is still located in the high frequency part of the folded spectrum, leaving not touched the low portion of the spectrum, preserving the visual meaning of the picture even after the scrambling operation and making easier the task of standard video encoders more easy by keeping low high frequency coefficients will be low after transform.

The proposed method can also be applied to the case of PDMD of filtered data. The proposed method can also be applied to a method for encoding/decoding a video signal sequence that provides for generating therefrom multiple description subsequences by means of suitable equations systems, represented by corresponding encoding matrixes designed and optimized using mathematical techniques, and provides decoding matrixes that are the inverse or pseudoinverse of such encoding matrixes for decoding the video signal at the receiver side.

Such a method substantially provides for generating at the pre-processing block a multiple descriptions vector $\vec{d}$, containing a plurality of descriptions, from $d_1$ to $d_D$, where D indicates the number of descriptions. Such a descriptions vector $\vec{d}$, is generated by using a system of equations, whose coefficients are represented by a corresponding encoding matrix M, whereas a pixel values vector $\vec{p}$, related to a group G of P pixels in the input signal I, $p_1 \ldots p_P$, represent a variable vector. Descriptions vector $\vec{d}$ is vector of constants generated by a weighted sum of such variables, i.e. by matrix multiplying such a pixel values vector $\vec{p}$ by the encoding matrix M, according to the following relationship:

$$\vec{d} = M\vec{p}$$

Such a method further provides for merging at the post-processing block an available descriptions vector $\vec{d}'$, using a further system of equations, represented by a corresponding decoding matrix M' that is in an inversion relationship with such an encoding matrix M. In particular the decoding matrix M' is the inverse or pseudoinverse of such encoding matrix M. In this case pixel values vector $\vec{p}$ represents the unknown quantity to be calculated, by matrix multiplying the available descriptions vector $\vec{d}'$ by the decoding matrix M', according to the following relationship:

$$\vec{p} = M'\vec{d}'$$

Equations systems, represented by the encoding matrix M and by the decoding matrix M' can be designed and optimized using mathematical techniques and equivalence with a bank of filters can be further exploited for circuit implementation of such matrixes M and M'. Scrambling according to the proposed method can be applied by a suitable permutation of the coefficients of the encoding matrix M. It must be noted that the proposed method applies to audio signals as well.

The encoders that operate through lossy algorithms usually apply a highest degree of quantization to subbands that have less perceptive importance. In terms of video signal, this means the high frequency subbands. In terms of audio signal, on the other hand, this means the masked subbands, i.e. the subbands bearing a content that cannot be perceived by a user since adjacent subbands carry a higher perceived power.

Since spectrum scrambling aims to place the quantization error introduced by the encoders in subbands less important from a perceptive point of view, after unfolding of the spectrum, the proposed method can be applied also to audio signals, with respect to masked subbands. The spectrum scrambling must transfer in such subbands the subbands that would be normally quantized by an audio encoder operating on the single not downsampled description.

It must be noted that, due to masked subbands disposition in audio signals, the scrambled and unfolded spectrum has masked subbands in final positions that are different from the original positions in the original spectrum. A possible approach is to perform simultaneous coding of audio multiple descriptions, by coordinating and forcing the choice of the subbands to be quantized in the modified and folded spectra. Another possible approach is to identify a scrambling pattern that does not change the distribution of masks as seen by the independent audio codecs.

Consequently, without prejudice to the underlying principle of the invention, the details and embodiments may vary, also significantly, with respect to what has been described and shown by way of example only, without departing from the scope of the invention as defined by the annexed claims.

That which is claimed is:

1. A method for encoding media signals with an encoding system, the method comprising:
    generating multiple descriptions associated with data of the media signals through a downsampling operation performed on the data within a module of the encoding system, and including
        obtaining a spectral representation of the data, comprising bands associated to different frequency ranges, the bands being obtained by a quantization operation and including at least one highly quantized band, and
        performing a scrambling operation on the spectral representation by moving the at least one highly quantized band to a different frequency range prior to the downsampling,
        the scrambling operation comprising applying a reflection process to the at least one highly quantized band.

2. The method of claim 1, wherein obtaining the spectral representation comprises transforming the data into the frequency domain.

3. The method of claim 2, wherein the transforming includes establishing a correspondence among coefficients of the transform and frequency bands and applying permutations to coefficients of the transform.

4. The method of claim 3, wherein applying permutations to the coefficients matches a downsampling factor.

5. The method of claim 1, wherein the media signal comprises a video signal, the data comprises pixel data, and obtaining the spectral representation is performed in a pixel domain.

6. The method of claim 5, wherein obtaining the spectral representation in the pixel domain includes isolating frequency bands through a bandpass filtering step and remodulating the frequency bands to a given frequency by multiplication with a sinusoidal signal.

7. The method of claim 5, wherein obtaining the spectral representation performed in the pixel domain includes moving frequency bands to zero frequency through a demodulation step and a lowpass filtering step, then moving the frequency bands to a desired frequency by a modulation step and lowpass filtering step.

8. A method for encoding media signals with an encoding system, the method comprising:
    generating multiple descriptions associated with data of the media signals through a downsampling operation performed on the data within a module of the encoding system, and including
        obtaining a spectral representation of the data, comprising bands associated to different frequency ranges, the bands including at least one quantized band, and
        performing a scrambling operation on the spectral representation by moving the at least one quantized band to a different frequency range prior to the downsampling,
        the scrambling operation comprising applying a reflection process to the at least one quantized band.

9. The method of claim 8, wherein obtaining the spectral representation comprises transforming the data into the frequency domain.

10. The method of claim 9, wherein the transforming includes establishing a correspondence among coefficients of the transform and frequency bands and applying permutations to coefficients of the transform.

11. The method of claim 10, wherein applying permutations to the coefficients matches a downsampling factor.

12. The method of claim 8, wherein the media signal comprises a video signal, the data comprises pixel data, and obtaining the spectral representation is performed in a pixel domain.

13. The method of claim 12, wherein obtaining the spectral representation in the pixel domain includes isolating frequency bands through a bandpass filtering step and remodulating the frequency bands to a given frequency by multiplication with a sinusoidal signal.

14. The method of claim 12, wherein obtaining the spectral representation performed in the pixel domain includes moving frequency bands to zero frequency through a demodulation step and a lowpass filtering step, then moving the frequency bands to a desired frequency by a modulation step and lowpass filtering step.

15. A method for decoding media signals with a decoding system, wherein the media signals are encoded by generating multiple descriptions associated with data of the media signals through a downsampling operation performed on the data with an encoding system, and including obtaining a spectral representation of the data, comprising bands associated to different frequency ranges, the bands including at least one quantized band, and performing a scrambling operation on the spectral representation by moving the at least one quantized band to a different frequency range prior to the downsampling, the scrambling operation comprising applying a reflection process to the at least one quantized band, the decoding method comprising:
    decoding the multiple descriptions for reconstructing the data, within the decoding system, by performing a descrambling operation on the multiple descriptions and then merging the multiple descriptions.

16. The method of claim 15, wherein the descrambling operation is the inverse of the scrambling operation.

17. The method of claim 15, wherein generating multiple descriptions comprises obtaining a pixel values vector by selecting a group of pixels of a video signal, and applying an encoding matrix to the pixel values vector; the decoding comprising applying a decoding matrix, that is inversely related with the encoding matrix, to a descriptions vector to obtain the pixel values vector.

18. A system for encoding media signals comprising:
    a module configured to generate multiple descriptions associated with data of the media signals, through a downsampling operation performed on the data, and by at least
        obtaining a spectral representation of the data, comprising bands associated to different frequency ranges, the bands including at least one quantized band, and
        performing a scrambling operation on the spectral representation by moving the at least one quantized band to a different frequency range prior to the downsampling,
        the scrambling operation comprising applying a reflection process to the at least one quantized band.

19. The system of claim 18, wherein the module is configured to obtain the spectral representation by transforming the data into the frequency domain.

20. The system of claim 18, wherein the media signal comprises a video signal, the data comprises pixel data, and the module is configured to obtain the spectral representation in a pixel domain.

21. The system of claim 18, further comprising a decoding module configured to decode the multiple descriptions to reconstruct the data by performing a descrambling operation on the multiple descriptions and then merging the multiple descriptions.

22. The system of claim 21, wherein the descrambling operation is the inverse of the scrambling operation.

23. A non-transitory computer-readable medium having computer executable instructions for encoding media signals, the instructions comprising:
    generating multiple descriptions associated with data of the media signals through a downsampling operation performed on the data, and including
        obtaining a spectral representation of the data, comprising bands associated to different frequency ranges, the bands including at least one quantized band, and
        performing a scrambling operation on the spectral representation by moving the at least one quantized band to a different frequency range prior to the downsampling,
        the scrambling operation comprising applying a reflection process to the at least one quantized band.

* * * * *